United States Patent
Proctor, Jr. et al.

(10) Patent No.: US 6,212,220 B1
(45) Date of Patent: Apr. 3, 2001

(54) METHOD AND APPARATUS FOR CREATING NON-INTERFERING SIGNALS USING NON-ORTHOGONAL TECHNIQUES

(75) Inventors: James A. Proctor, Jr., Indialantic; John Hoffmann, Melbourne; Antoine Rouphael, Indialantic, all of FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/255,956

(22) Filed: Feb. 23, 1999

(51) Int. Cl.$^7$ .............................. H04B 15/00; H04K 1/00; H04L 27/30
(52) U.S. Cl. ............................................. 375/130; 370/342
(58) Field of Search .................................... 375/200, 206; 370/320, 335, 342, 441

(56) References Cited

U.S. PATENT DOCUMENTS

| | | | |
|---|---|---|---|
| 4,460,992 | 7/1984 | Gutleber | 370/19 |
| 5,103,459 | 4/1992 | Gilhousen et al. | 375/1 |
| 5,559,788 * | 9/1996 | Zscheile, Jr. et al. | 370/206 |
| 5,606,574 * | 2/1997 | Hasegawa et al. | 375/200 |
| 5,805,567 * | 9/1998 | Ramesh | 370/204 |

* cited by examiner

*Primary Examiner*—Don N. Vo
*Assistant Examiner*—Phuong Phu
(74) *Attorney, Agent, or Firm*—Hamilton, Brook, Smith & Reynolds, P.C.

(57) ABSTRACT

A method and apparatus for creating non-interfering signals to be simultaneously transmitted over a common frequency in a wireless communication systems, such as a CDMA system, without the use of orthogonal codes and/or orthogonal code generation techniques. The system provides a pseudorandom combiner that receives the information signal and a pseudorandom code sequence and combines the information signal with the pseudorandom code sequence to produce the first combined signal. A channel sequence combiner receives the first combined signal and a repetitive maximum length channel sequence and combines these signals to produce a second combined signal. A selector receives the first combined signal, the second combined signal and a repetitive strobe signal, and selects either the first combined signal or the second combined signal to produce a modulated signal based upon a value of the repetitive strobe signal. The channel sequence values are non-orthogonal repetitive series of N bits, and the strobe signal is N+1 bits.

4 Claims, 3 Drawing Sheets

METHOD AND APPARATUS FOR CREATING NON-INTERFERING SIGNALS USING NON-ORTHOGONAL TECHNIQUES

FIELD OF THE INVENTION

This invention relates generally to wireless communication systems, and more particularly to a mechanism for use within a wireless multiple access system, such as a Code Division Multiple Access (CDMA) system, which achieves signal orthogonalization without the use of orthogonal codes.

BACKGROUND OF THE INVENTION

The wireless communications industry has grown immensely in the past twenty years. In particular, the use of cellular or wireless phones and other such devices has been widely accepted by the public. The first generation of such cellular telephone devices operated on an analog transmission principle using a pair of frequencies per transmission session (sending and receiving) per user. Shortly after cellular devices became popular, digital cellular devices were perfected and appeared in the marketplace. Digital cellular devices operate by modulating a digital signal onto a carrier wave. Since the signal is digital, certain techniques can then be used to allow multiple users access to the same frequency spectrum, thereby effectively increasing system capacity.

One such technique, called Code Division Multiple Access (CDMA), provides a multiple access technique that offers certain benefits over analog cellular transmission techniques. In CDMA, a single radio frequency is used as a carrier for the communications of multiple users. By way of example, two CDMA wireless telephone users who are each making a call may have communications simultaneously transmitted using one or more of the same radio frequencies. Each user's signal is encoded with a pseudorandom noise (PN) code at the transmitter in such a way that it can be properly decoded at a received with minimal interference to another user's signal.

Certain types of interference problems however still exist in CDMA systems. For instance, a fading characteristic called Rayleigh fading occurs when a transmission signal is reflected from many different features of the physical transmission environment. As a result, the signal arrives at the destination receiver from many directions and each signal may have a different transmission delay. These effects can result in destructive summation of the signals, otherwise known as multi-path fading.

Certain CDMA modulation techniques can be used to mitigate the adverse effects of multipath fading and interference, while exploiting frequency reuse advantages. One such prior art modulation technique widely implemented in CDMA systems uses orthogonal codes. Using this technique, a digital data signal to be transmitted is first modulated with a pseudorandom noise (PN) code. The resulting signal is then modulated with an orthogonal code created from an orthogonal code generator to create a user signal which is orthogonal to other user signals. The orthogonal signal can be transmitted on the same frequency as an orthogonal signal created with an another code that is orthogonally related to the first orthogonal code. That is, both orthogonal codes are mathematically interrelated such that the signals produced from the modulations using each code are non-interfering when transmitted on the same frequency together.

Benefits of digital CDMA systems include a decreased requirement for transmission power which results in longer battery life, increased clarity, higher radio frequency reuse, and favorable signal-to-noise ratio results. Since the frequency spectrum can be reused multiple times in such systems, an overall increase in system user capacity also results. For specific details of the use of CDMA techniques in a multiple access system, the reader is referred to U.S. Pat. No. 4,901,307.

SUMMARY OF THE INVENTION

The present invention provides a mechanism to achieve similar results as described above without the use of an orthogonal code generator or orthogonal codes. Instead, a combination of procedures referred to herein as channel sequencing and bit strobing are used to produce two or more resultant signals that do not interfere with one another when transmitted on the same frequency. That is, the resultant signals appear to be, and actually are, orthogonal to one another. However, the process of creating these resultant signals does not require an orthogonal code generator nor orthogonal codes. As such, device power and processing resources can be conserved on a wireless device such as CDMA phone or laptop computer which results in prolonged battery life.

Instead of using orthogonal codes, the invention provides a rolling selection of channels with which a modulated information signal can again be modulated. The rolling channels are modulated with the modulated information signal to produce a resultant signal that is double modulated. The resultant signal can be transmitted without interference most of the time. However, at times when the value of the rolling channel would produce a double modulated resultant signal that is in an interfering or non-orthogonal state with another users resultant signal, a strobe signal is used to alter the selection of the resultant signal. The strobe signal essentially reverts to selecting the original singly modulated information signal, instead of the double modulated signal.

In contrast to prior art systems which always impose a second stage orthogonal code modulation technique on a first modulated PN signal, the invention uses the channel selection and bit strobe mechanism which only requires a secondary modulation process part of the time. At times when the secondary modulation process is not needed, the original modulated signal can be used as a resultant signal without interference. Neither the first nor the second modulation process within this invention requires the use of orthogonal codes. Hence, the invention results in a decrease in the amount of total modulation that is required to be performed and lowers processing and power consumption costs.

In its simplest embodiment, the invention provides a system and method for modulating an information signal in a spread spectrum communication system, such as a CDMA communication system. An input information signal to be transmitted can be a digitized voice or data signal generated by a device such as a CDMA phone or modem coupled to a computer. The system uses a first pseudorandom combiner that receives the input information signal and a pseudorandom code sequence. The pseudorandom code sequence is not an orthogonal code sequence. The pseudorandom combiner combines the information signal with the pseudorandom code sequence to produce a first combined signal. The first combined signal alone may be used at certain times as the resultant signal, without further modulation.

To make this determination, a channel sequence combiner is provided that receives the first combined signal which includes the information signal in a modulated form. The channel sequence combiner also receives a repetitive maximum length channel sequence. The repetitive maximum length channel sequence is also not an orthogonal code. The channel sequence combiner combines the first combined signal with the repetitive maximum length channel sequence to produce a second combined signal.

Finally, a selector is provided which is coupled to receive the first combined signal, the second combined signal and a repetitive strobe signal. The selector selects one of either the first combined signal or the second combined signal to produce a modulated signal based upon a value of the repetitive strobe signal. The repetitive strobe signal is of a length greater than the repetitive maximum length channel sequence.

As governed by the repetitive strobe signal, there are times when the system of the invention transmits just the first combined signal, instead of the second combined signal which requires the second modulation process.

According to more particular aspects of the invention, the repetitive maximum length channel sequence is a non-orthogonal repeating bit sequence of length N, and the repetitive strobe signal is non-orthogonal repeating bit sequence of at least length N+1. The bits 0 through N of the repetitive strobe signal cause the selector to select the second combined signal as the modulated signal and bit N+1 of the repetitive strobe signal selects the first combined signal as the modulated signal. As such, the invention can produce resultant orthogonal-like signals without the use of orthogonal code generators and/or orthogonal codes.

During the operation of each cycle of both the channel sequence combiner and the selector, a bit from each of the repetitive maximum length channel sequence and the repetitive strobe signal are processed respectively, such that during processing of the first bit of a start of a next cycle of bits from the repetitive maximum length channel sequence by the channel sequence combiner, the selector is processing the last bit of the repetitive strobe signal. Preferably, the repetitive maximum length channel sequence is a non-orthogonal repeating bit sequence. An example of the channel sequence is 110. The repetitive strobe signal is a non-orthogonal repeating bit sequence, with an example appearing as 0001.

In this manner, the system of the invention is always sure to select a correct non-interfering resultant signal without the use of orthogonal codes and/or orthogonal code generation and modulation techniques.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
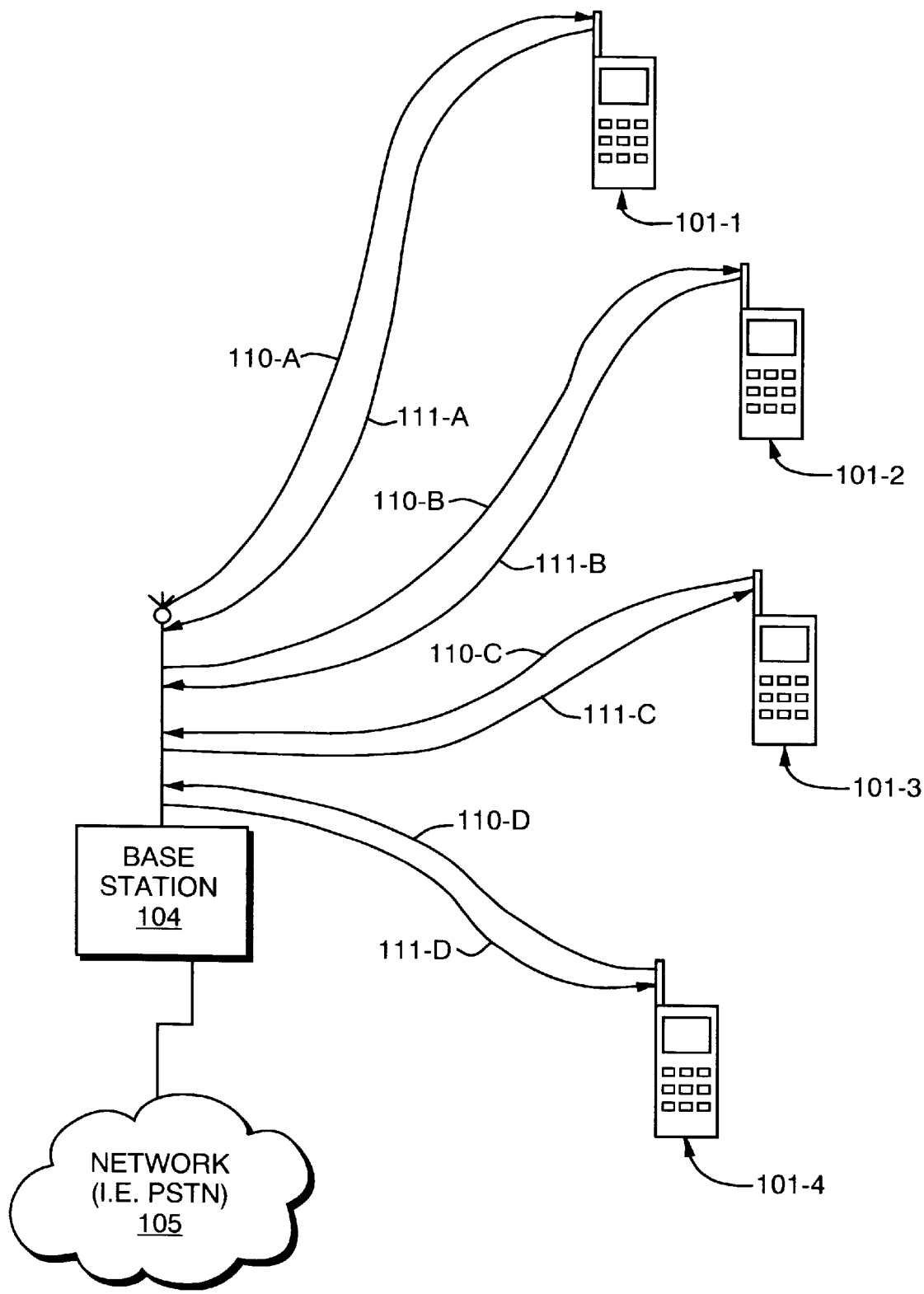
FIG. 1 illustrates a CDMA communications system in which the present invention may be implemented.

FIG. 1 illustrates a typical multiple access mobile communications system, system 100 includes mobile subscriber units 101-1, 101-2, 101-3 and 101-4 (collectively subscribers 101) as well as one or more base stations 104. These components provide the functions necessary in order to achieve the desired implementation of the invention. The subscriber units 101 provide wireless data (which may include video data, facsimile data, and/or modem data) and/or voice services and can connect devices such as, for example, laptop computers, portable computers, personal digital assistants (PDAs), or the like through base station 104 to a network 105. Network 105 may be a Public Switch Telephone Network (PSTN), an ISDN network or other circuit-switched network, or may be a connectionless packet based computer network such as the Internet. The subscriber units 101 may be mobile in nature and may travel from one location to another while communicating in a wireless manner with the base station 104 using the radio frequency transmission techniques of this invention.

A single base station 104 and four mobile subscribers units 101 are shown by way of example only, for ease of description of the invention. The invention is applicable to systems in which there are typically many more subscriber units 101 communicating with one or more, and typically many, base stations 104.

The wireless communications systems 100 to which this invention may be applied are systems that use such techniques as CDMA, TDMA, GSM or other systems where more than one subscriber signal is to be simultaneously transmitted over a common frequency. Preferably, the invention is applied in a CDMA-like system which uses protocols similar to that specified by the Telecommunications Industry Association (TIA) IS-95 or the newly emerging IS-95B standards. However, the invention is applicable to any communication systems using multiple access techniques.

In order to provide data and/or voice communication between the subscriber units 101 and the base station 104, wireless transmission of data over a limited number of radio frequency channel resources is provided via forward communication channels 110-1 through 110-4, and reverse communication channels 111-1 through 111-4. The invention provides a way to generate the forward and reverse link signals 110, 111 such that during simultaneous transmission of any two of such signals on the same frequency, the signals 110, 111 will be non-interfering or orthogonal in nature. The invention accomplishes this without using orthogonal code generators and/or orthogonal codes to generate the signals.

Figure 2:
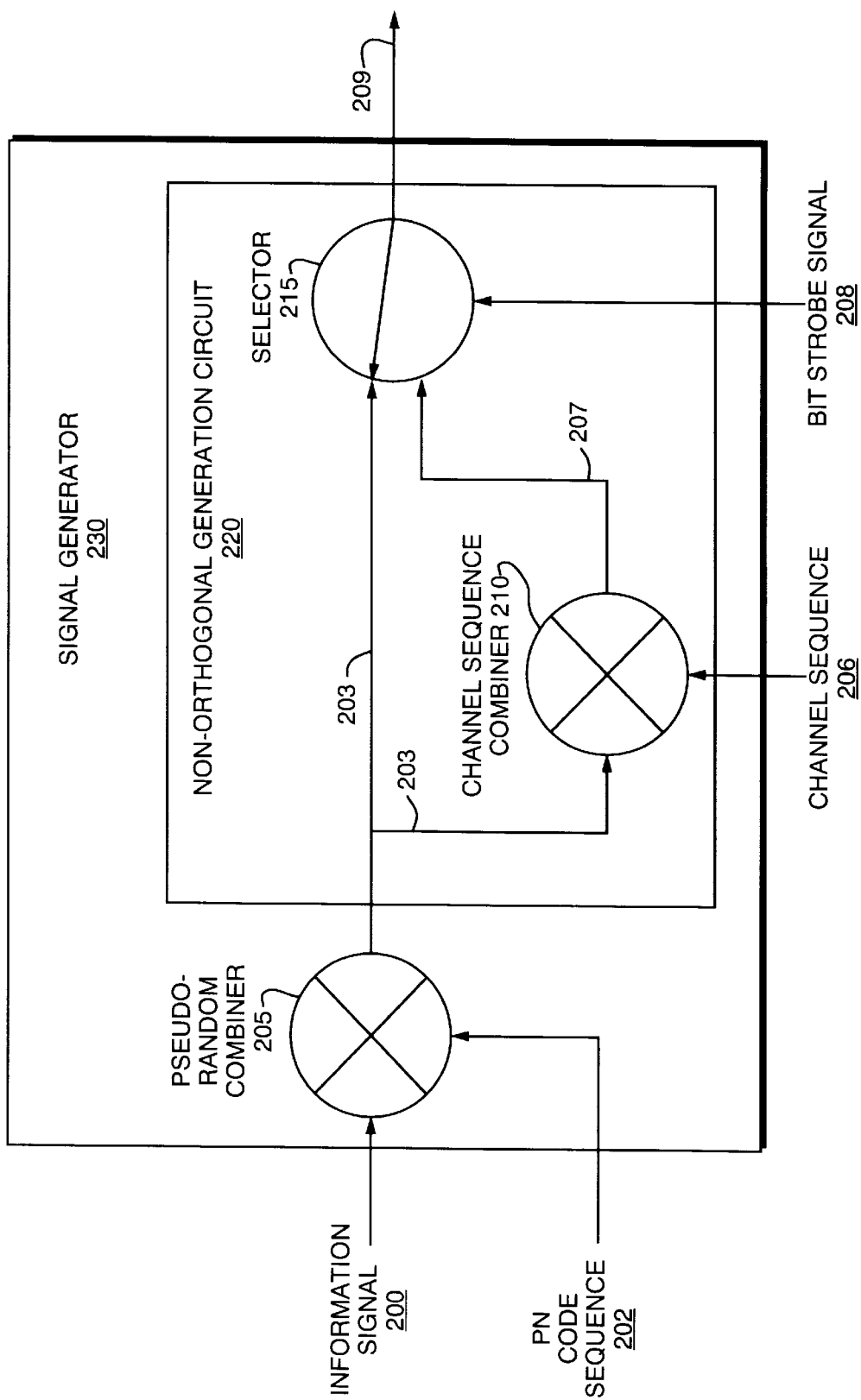
FIG. 2 illustrates a block diagram of a non-interfering signal generation process according to this invention.

FIG. 2 illustrates a block diagram of a preferred embodiment of the invention which generates an orthogonalized signal without the use of an orthogonal code generator and/or orthogonal codes. An initial information signal 200, which represents a signal containing user data (or voice) to be transmitted, is input to a pseudorandom combiner 205. Also input into the pseudorandom combiner 205 is a pseudorandom (PN) code sequence 202. The pseudorandom combiner 205 combines the information signal 201 with the pseudorandom code sequence to produce a first combined signal 203. The pseudorandom combiner 205 then modulates the information signal 201 with this pseudorandom code sequence 202. The first combined signal 203 is then input into a non-orthogonal generation circuit 220. Within the non-orthogonal generation circuit 220, the first combined signal is input into each of a channel sequence combiner 210 and a selector 215.

The channel sequence combiner 210 receives the first combined signal 203 (which includes the modulated information signal 201) and also receives a channel sequence 206. Preferably, the channel sequence 206 is a repetitive maximum length channel sequence. The channel sequence combiner 210 combines the first combine signal 203 with the repetitive maximum length channel sequence 206, preferably via a modulation technique. As a result of this modulation, the channel sequence combiner 210 outputs a second channel sequence combined signal, or just second combined signal 207. The second combined signal 207 represents the modulated information signal 201 (modulated first with the PN sequence 202) which is again modulated with the channel sequence 206.

The second combined signal 207 is also input into the selector 215, as is the first combined signal 203. The selector also receives as input a repetitive strobe signal 208. Based upon the value of the repetitive strobe signal 208, the selector 215 selects one of the either the first combined signal 203 (a singly modulated signal) or the second combined signal 207 (the doubly modulated signal) to produce as output a modulated signal 209. The non-orthogonal generation circuit 220 then outputs the modulated signal 209 as a resultant signal to be transmitted.

The period of the repetitive bit strobe signal 208 is of a length greater than the repetitive maximum length channel sequence 206. By way of example, if the channel sequence 206 has a period of three bits in length (i.e. 111, 011, 101, 110), the bit strobe signal 208 has a period of at least four bits (i.e., 0001). As such, an entire set of channel sequences 206, such as 011, 110 and 110, can be cycled through, at which point the strobe signal 208 will be activated to select the first combined signal 203, instead of the second combined signal 207.

In this manner, double modulation occurs only for each channel sequence 206, and then, when all channel sequence values have occurred, the selector selects for transmission (i.e,, selects as the modulated signal 209) the singly modulated first combined signal 203 instead of the second combined signal 207.

By properly choosing values for both the non-orthogonal channel sequence 206 and strobe signal 208, the modulated signal 209 that is output will be orthogonal in nature as compared to another signal created using a corresponding, but offset code channel sequence 206.

Table 1 below illustrates the relationship between the channel sequence values 206 and the repetitive strobe signal values 208.

when the repetitive bit strobe signal 208 has a zero, "0," or low value, the selector 215 selects the second combined signal 207. There are three low or "0" values in a row for the repetitive bit strobe signal 208. As such, the channel sequence combiner 210 is able to modulate three successive channel sequence bits 206 with the first combine signal 203, and the selector 215 will select as output the second combined signal 207, before the repetitive bit strobe signal 208 changes to a "1" or high signal. A high or "1" bit strobe signal value 208 then causes the selector 215 to switch states and select the first combine signal 203, rather than the second combined signal 207.

In this manner, the majority of the time the resultant modulated output signal 209 will be selected via bit strobe 209 in a low state (i.e., will select the second combined signal 207), and will thus include the modulated channel sequence 206. But each fourth bit strobe 209 will cause the first combined signal 203 to be output which does not include the channel sequence value 206.

During the operation of the information modulation circuit 230, the resultant modulated output signal 209 may be orthogonally combined (i.e., modulated) with other resultant modulated output signals created with other information modulation circuits 230.

Figure 3:
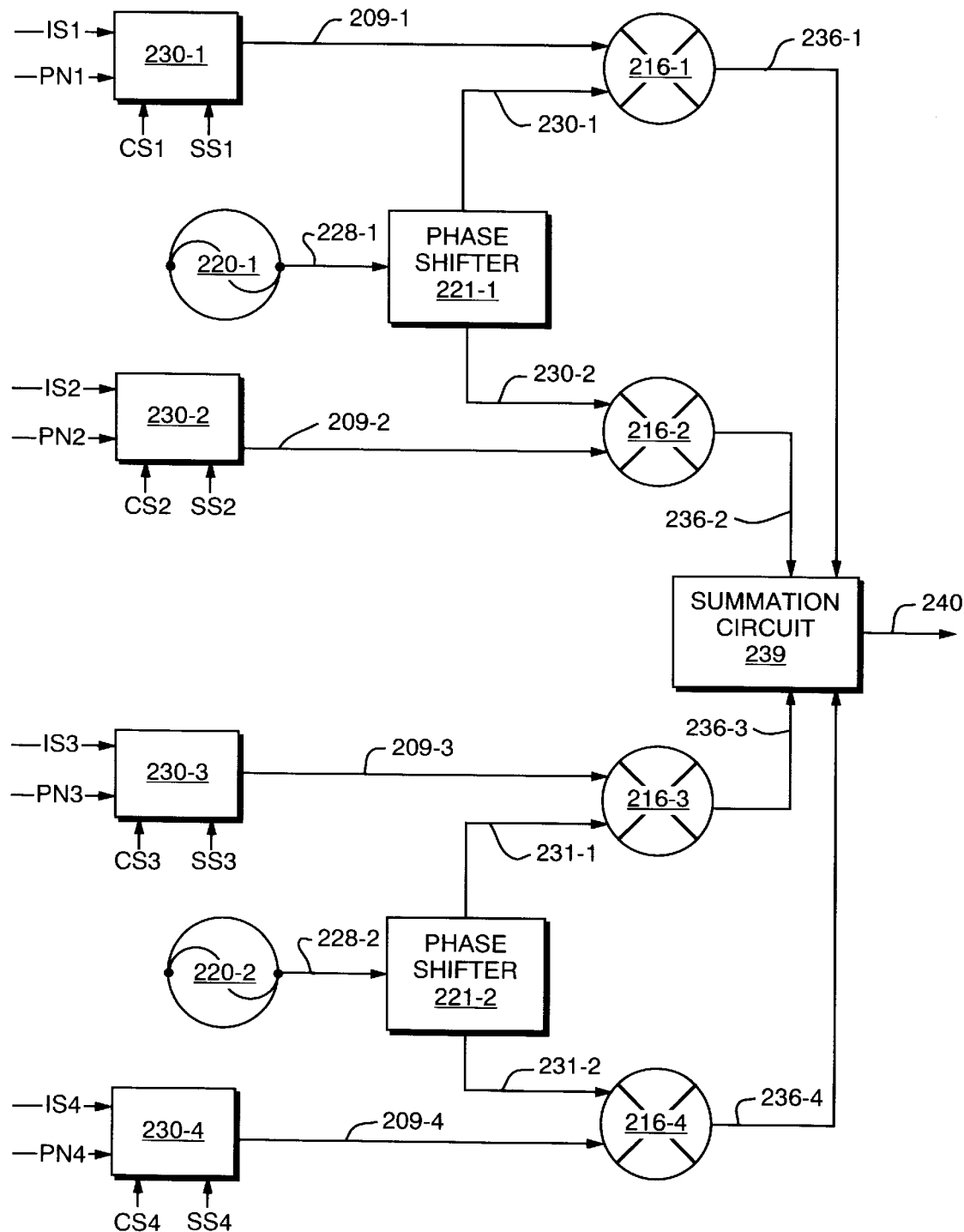
FIG. 3 illustrates a block diagram of a signal generation system that allows up to four information signals to be simultaneously transmitted on a common frequency without interference.

FIG. 3 illustrates this principle. As shown, four information modulation circuits 230-1, 230-2, 230-3 and 230-4 are provided. Each of the four information modulation circuits 230 receives a distinct information signal (IS) IS 201-1, IS 201-2, IS 201-3 and IS 201-4 as input. Each information signal 201 represents a distinct digital data stream to be transmitted on the same frequency with the other information signals 201. While the information signal 201 is referred to as a digital data stream, it may be representative of many different types of encoded data, such as voice data, video data, facsimile, data, modem data, or any other type of data.

The information modulation circuits 230-1 through 230-4 each operate as described previously with respect to FIG. 2. However, each information modulation circuit 230 receives a pseudorandom code sequence 202-1, 202-2, 202-3 or 202-4 that is unique from the other pseudorandom (PN) code sequences 202. Preferably, each information modulation circuit 230 receives an in-phase short pseudorandom (PN) code sequence 202, although long PN codes may be used as well. The generation of short, long or other PN code sequences is known in the art and will not be discussed further.

| C | 1 | 1 | 1 | 1 | 0 | 1 | 0 | 1 | 0 | 1 | 1 | 1 | 1 | 1 | 0 |
|---|---|---|---|---|---|---|---|---|---|---|---|---|---|---|---|
| B | 0 | 0 | 0 | 1 | 0 | 0 | 0 | 1 | 0 | 0 | 0 | 1 | 0 | 0 | 0 | 1 | 0 |

Table 1: Channel Sequence 206 in Relation to Bit Strobe Sequence 208

In Table 1, the top row is labeled "C" and represents the values of channel sequence 206. In this example, the channel sequence 206 is a 3-bit rolling code, having values of 111, 110, 101, 011. Note that the value 000 is not used. After the final 011 value, the channel sequence repeats itself beginning again with 111.

The value of the repetitive bit strobe signal 208 is represented in Table 1 by the "B" row. The bit strobe 208 has a repetitive value of 0001, and endlessly repeats during the operation of information modulation circuit 230.

In this example the bit strobe is four bits long and the channel sequence strobe is three bits. Accordingly, at times Each information modulation circuit 230 also receives a channel sequence value 203-1, 203-2, 203-3 or 203-4 that is offset by one bit from the other channel sequence (CS)values 203 used for the other information modulation circuits 230. As an example, assume there are four information signals 200-1 through 200-4 to be transmitted on a single frequency at the same time. In order for this to occur, the invention converts each information signal 201 into a resultant modulated output signal 209-1 through 209-4 that will be non-interfering or orthogonal with the others. To do so, the channel sequence(CS) value 206-1 for the information modulation circuit 230-1 can begin, for example, with a value of "111". The channel sequence(CS) value 206-2 for the information modulation circuit 230-2 can begin with the next channel sequence value "110". The channel sequence (CS) value 206-3 for information modulation circuit 230-3 can begin with the next sequence value "101", and the final information modulation circuit 230-4 begins with a channel sequence(CS) value 206-4 of "011."

The bit strobe signal(BSS) value 208 input into each signal generator is the same in each case. That is, for the above-identified channel sequences, a repetitive bit strobe signal value of "0001" is used and is a common signal amongst information modulation circuits 230-1 through 230-4.

Using the above identified inputs 201, 202, 206 and 208 for each information modulation circuit 230-1 through 230-4, modulated output signals 209-1 through 209-4 are produced. The modulated output signals 209-1 through 209-4 can each be combined together and transmitted on a single frequency without interference, due to how each was created as previously explained.

Specifically, as illustrated, oscillators 220-1 and 220-2 are provided to produce oscillation signals 228-1 and 228-2 which are fed into respective phase splitters 221-1 and 221-2. Each phase splitter 221-1 and 221-2 divides its respective oscillation signal 228-1 or 228-2 into first and second phase shifted signals 230-1, 230-2 (first phase shifted signals) and 231-1, 231-2 (second phase shifted signals), respectively. Phase shifted signals 230-1, 230-2 are preferably one-hundred eighty degrees out-of-phase with one another.

Modulator 218-1 then combines the modulated output signal 209-1 with the respective phase shifted signal 230-1 to produce a summation signal 236-1, and the modulator 218-2 combines the modulated output signal 209-2 with its respective phase shifted signal 230-2 to produce a summation signal 236-2.

In one embodiment, modulators 218-1 and 218-2 use bipolar phase shift keyed (PSK) modulation and the information signals 201-1 and 202-2 are the same. Alternatively, modulators 218-1 and 218-2 use quadrature phase shift keyed (QPSK) modulation and the information signal 201-1 is in an N-State while the information signal 201-2 is in an N+1 state. That is, if each information signal 201-1 and 201-2 is different, the information signal 201-1 is fed as input to the signal generator 230-1 as bit number N, while at the same time, the information signal 201-2 is fed as input to the signal generator 230-2 as bit N+1. In other words, information signal 201-2 is one bit ahead of information signal 201-1. The delay in information signal 201-1 can be accomplished by a simple delay circuit.

Likewise, modulator 218-3 combines the modulated output signal 209-3 with its respective phase shifted signal 231-1 to produce a summation signal 236-3, and the modulator 218-4 combines the modulated output signal 209-4 with its respective phase shifted signal 231-2 to produce a summation signal 236-4.

As also explained above, in one embodiment, modulators 218-3 and 218-4 can use bipolar phase shift keyed (PSK) modulation and the information signals 201-3 and 202-4 are the same. Alternatively, modulators 218-3 and 218-4 can use quadrature phase shift keyed (QPSK) modulation and the information signal 201-3 is in an N-State while the information signal 201-4 is in an N+1 state. In this case, information signal 201-4 is one bit ahead of information signal 201-3. The delay in information signal 201-3 can be accomplished as noted above by a simple delay circuit.

Finally, to complete the processing, summation circuit 239 sums each summation signal 236-1 through 236-4 into a single non-interfering user information signal 240.

In this manner, the invention allows each of the information signals 201-1 through 201-4 to be processed as explained above into a single signal 240 without each information signal 201 interfering with the others and without the use of orthogonal codes and orthogonal code generation techniques.

Preferably, information signals 201-1 through 201-4 originate from land line connections with the base station and each information signal 201 is associated with (i.e., is destined for) a separate mobile subscriber unit (e.g., 101-1, 101-2, 101-3, 101-4). That is, in a preferred embodiment, the information signals 201 are transmitted on the forward link (as represented by forward links 110-1 through 110-4 in FIG. 1) from the base station 104 to the mobile subscriber units 101-1 through 101-4.

Alternatively, the information signals 201-1 through 201-4 can all originate from within a single mobile subscriber unit (i.e., 101-1) and can be transmitted on the reverse link (i.e., as reverse link signal 111-1). In this alternative scenario, the information signals 201-1 through 201-4 may be, for example, streams of data from a laptop computer or other device, and all four may be required to achieve the necessary bandwidth needed for a particular application in use on the computer. A streaming video stream generated by a laptop computer application may be broken into a number of individual digital data streams. Each may be processed as illustrated in FIG. 3 as an individual information signal 201. As another example, an ISDN connection serving a video stream, a data stream and a voice stream can use the invention to combine each stream as one of the information signals 201 into an orthogonally related signal (output signal 240, to be explained) for transmission on a common frequency.

While only four information signals 201 are illustrated as being able to be transmitted together on a common frequency in the above examples, the invention is not limited as such. Rather, more or less than four signals can be used by varying the channel sequence and bit strobe lengths. By way of example, if a channel sequence length of 6 bits is used, the bit strobe length would be seven bits, and many more than four information signals could be combined orthogonally on the same frequency.

The invention allows very high bandwidth applications to transmit separate but related streams of data, or allows one mobile subscriber device to transmit many unrelated streams of data. The receiver (i.e. base station 104 in this example) is responsible for either re-combining the separate but related information signals 201 or for routing each separate signal to its eventual destination.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for modulating an information signal in a spread spectrum communication system, the system comprising:

a channel sequence combiner receiving a first combined signal which includes the information signal in a modulated form, and receiving a repetitive maximum length channel sequence, the channel sequence combiner combining the first combined signal with a repetitive maximum length channel sequence to produce a second combined signal; and a selector coupled to receive the first combined signal, the second combined signal and a repetitive strobe signal, the selector selecting one of the first combined signal and the second combined signal to produce a modulated signal based upon a value of the repetitive strobe signal, wherein the repetitive strobe signal is of a length greater than the repetitive maximum length channel sequence; wherein the repetitive maximum length channel sequence is a non-orthogonal repeating bit sequence of length N and wherein the repetitive strobe signal is non-orthogonal repeating bit sequence of at least length N+1; and wherein bits 0 through N of the repetitive strobe signal cause the selector to select the second combined signal as the modulated signal and wherein bit N+1 of the repetitive strobe signal selects the first combined signal as the modulated signal.

2. The system of claim 1 further comprising:

a pseudorandom combiner receiving the information signal and a pseudorandom code sequence, the pseudorandom combiner combining the information signal with the pseudorandom code sequence to produce the first combined signal.

3. The system of claim 1 wherein during the operation of each cycle of both the channel sequence combiner and the selector, a bit from each of the repetitive maximum length channel sequence and the repetitive strobe signal are processed respectively, such that during processing of the first bit of a start of a next cycle of bits from the repetitive maximum length channel sequence by the channel sequence combiner, the selector is processing the last bit of the repetitive strobe signal.

4. The system of claim 1 wherein:

the repetitive maximum length channel sequence is a non-orthogonal repeating bit sequence appearing as 110; and wherein the repetitive strobe signal is a non-orthogonal repeating bit sequence appearing as 0001.

\* \* \* \* \*